United States Patent
Kashimoto et al.

(10) Patent No.: US 9,718,305 B2
(45) Date of Patent: Aug. 1, 2017

(54) BICYCLE RIM

(71) Applicant: Shimano Inc., Sakai, Osaka (JP)

(72) Inventors: Yoshikazu Kashimoto, Osaka (JP); Toru Iwai, Osaka (JP)

(73) Assignee: Shimano Inc., Osaka (JP)

( * ) Notice: Subject to any disclaimer, the term of this patent is extended or adjusted under 35 U.S.C. 154(b) by 183 days.

(21) Appl. No.: 14/686,702

(22) Filed: Apr. 14, 2015

(65) Prior Publication Data

US 2016/0303903 A1    Oct. 20, 2016

(51) Int. Cl.
| | |
|---|---|
| *B60B 21/08* | (2006.01) |
| *B60B 5/02* | (2006.01) |
| *B60B 21/02* | (2006.01) |

(52) U.S. Cl.
CPC ............... *B60B 21/08* (2013.01); *B60B 5/02* (2013.01); *B60B 21/025* (2013.01); *B60B 2360/34* (2013.01); *B60B 2900/111* (2013.01); *B60B 2900/321* (2013.01); *B60Y 2200/13* (2013.01)

(58) Field of Classification Search
CPC  B60B 5/02; B60B 21/00; B60B 21/02; B60B 21/025; B60B 21/062; B60B 21/08
USPC ........................ 301/95.101–95.103
See application file for complete search history.

(56) References Cited

U.S. PATENT DOCUMENTS

| | | | |
|---|---|---|---|
| 5,056,630 A | 10/1991 | Fujii et al. | |
| 5,492,769 A * | 2/1996 | Pryor | B05D 5/02 |
| | | | 428/552 |
| 6,338,574 B1 | 1/2002 | Shimizu et al. | |
| 6,354,668 B2 * | 3/2002 | Okajima | B60B 1/0215 |
| | | | 301/58 |
| 8,070,235 B2 * | 12/2011 | Reuteler | B29C 70/345 |
| | | | 301/64.702 |
| 2004/0090110 A1* | 5/2004 | Bernardi | B60B 21/08 |
| | | | 301/95.101 |
| 2006/0267397 A1 | 11/2006 | Possarnig et al. | |
| 2007/0102992 A1* | 5/2007 | Jager | B29C 70/462 |
| | | | 301/30 |
| 2009/0250995 A1* | 10/2009 | Tsai | B60B 5/02 |
| | | | 301/95.102 |
| 2012/0056468 A1* | 3/2012 | Tsai | B60B 5/02 |
| | | | 301/95.103 |

FOREIGN PATENT DOCUMENTS

EP    2 030 806 B1    8/2013

* cited by examiner

*Primary Examiner* — Jason Bellinger
(74) *Attorney, Agent, or Firm* — Global IP Counselors, LLP

(57) ABSTRACT

A bicycle rim is basically provided with a first annular side wall, a second annular side wall and an annular bridge. The first annular side wall includes a first braking contact portion. The second annular side wall includes a second braking contact portion. The annular bridge extends between the first and second annular side walls. At least one of the first and second braking contact portions has a plurality of soft additives at least partially embedded in a non-metallic layer.

16 Claims, 8 Drawing Sheets

BICYCLE RIM

BACKGROUND

Field of the Invention

This invention generally relates to a bicycle rim. More specifically, the present invention relates to a bicycle rim with an improved braking surface.

Background Information

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub portion and extend outwardly from the hub portion. The annular rim is coupled to the outer ends of the spokes and has an outer portion for supporting a pneumatic tire thereon. Typically, the spokes of the bicycle wheel are thin metal wire spokes.

In the past, most conventional bicycle rims were constructed of various metal materials. However, in more recent years, the bicycle rims have been constructed using composite materials to make them more lightweight. For example, in U.S. Pat. No. 7,464,994, a bicycle rim has been proposed that has a continuously extending resin material covering a portion of an annular metallic rim member. One example of a bicycle rim that is made primarily of woven carbon fibers is disclosed in U.S. Pat. No. 7,614,706.

SUMMARY

Generally, the present disclosure is directed to various features of a bicycle rim. In one feature, a bicycle rim is provided with an improved braking surface.

In view of the state of the known technology and in accordance with a first aspect of the present disclosure, a bicycle rim is provided that basically comprises a first annular side wall, a second annular side wall and an annular bridge. The first annular side wall includes a first braking contact portion. The second annular side wall includes a second braking contact portion. The annular bridge extends between the first and second annular side walls. At least one of the first and second braking contact portions has a plurality of soft additives at least partially embedded in a non-metallic layer.

In accordance with a second aspect of the present invention, the bicycle rim according to the first aspect is configured so that the soft additives are at least partially exposed on an outermost surface of the at least one of the first and second braking contact portions.

In accordance with a third aspect of the present invention, the bicycle rim according to the first aspect is configured so that both of the first and second braking contact portions have the soft additives.

In accordance with a fourth aspect of the present invention, the bicycle rim according to the second aspect is configured so that each of the soft additives has an exposed surface, each of the exposed surfaces is less than 50% of total surface area of each of the soft additives.

In accordance with a fifth aspect of the present invention, the bicycle rim according to the fourth aspect is configured so that each of the exposed surfaces is less than 20% of total surface area of each of the soft additives.

In accordance with a sixth aspect of the present invention, the bicycle rim according to the first aspect is configured so that each of the soft additives includes an elastomeric material.

In accordance with a seventh aspect of the present invention, the bicycle rim according to the sixth aspect is configured so that the elastomeric material is a nitrile rubber.

In accordance with an eighth aspect of the present invention, the bicycle rim according to the sixth aspect is configured so that the elastomeric material is a fluorinated elastomer.

In accordance with a ninth aspect of the present invention, the bicycle rim according to the first aspect is configured so that the non-metallic layer of the at least one of the first and second braking contact portions includes an epoxy layer defining the outermost surface of the at least one of the first and second braking contact portions.

In accordance with a tenth aspect of the present invention, the bicycle rim according to the ninth aspect is configured so that the soft additives are partially disposed in the epoxy layer.

In accordance with an eleventh aspect of the present invention, the bicycle rim according to the ninth aspect is configured so that the non-metallic layer further includes a fiberglass layer, and the epoxy layer is disposed directly on the fiberglass layer.

In accordance with a twelfth aspect of the present invention, the bicycle rim according to the eleventh aspect is configured so that the soft additives are partially disposed in the epoxy layer.

In accordance with a thirteenth aspect of the present invention, the bicycle rim according to the twelfth aspect is configured so that the soft additives are further partially disposed in the fiberglass layer.

In accordance with a fourteenth aspect of the present invention, the bicycle rim according to the first aspect is configured so that the annular bridge has a curved tubular tire engagement surface extending between the first and second annular side walls.

In accordance with a fifteenth aspect of the present invention, the bicycle rim according to the first aspect is configured so that each of the first and second annular side walls has a clincher portion along an outer peripheral edge.

Also other objects, features, aspects and advantages of the disclosed bicycle rim will become apparent to those skilled in the art from the following detailed description, which, taken in conjunction with the annexed drawings, discloses several embodiments of the bicycle rim.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
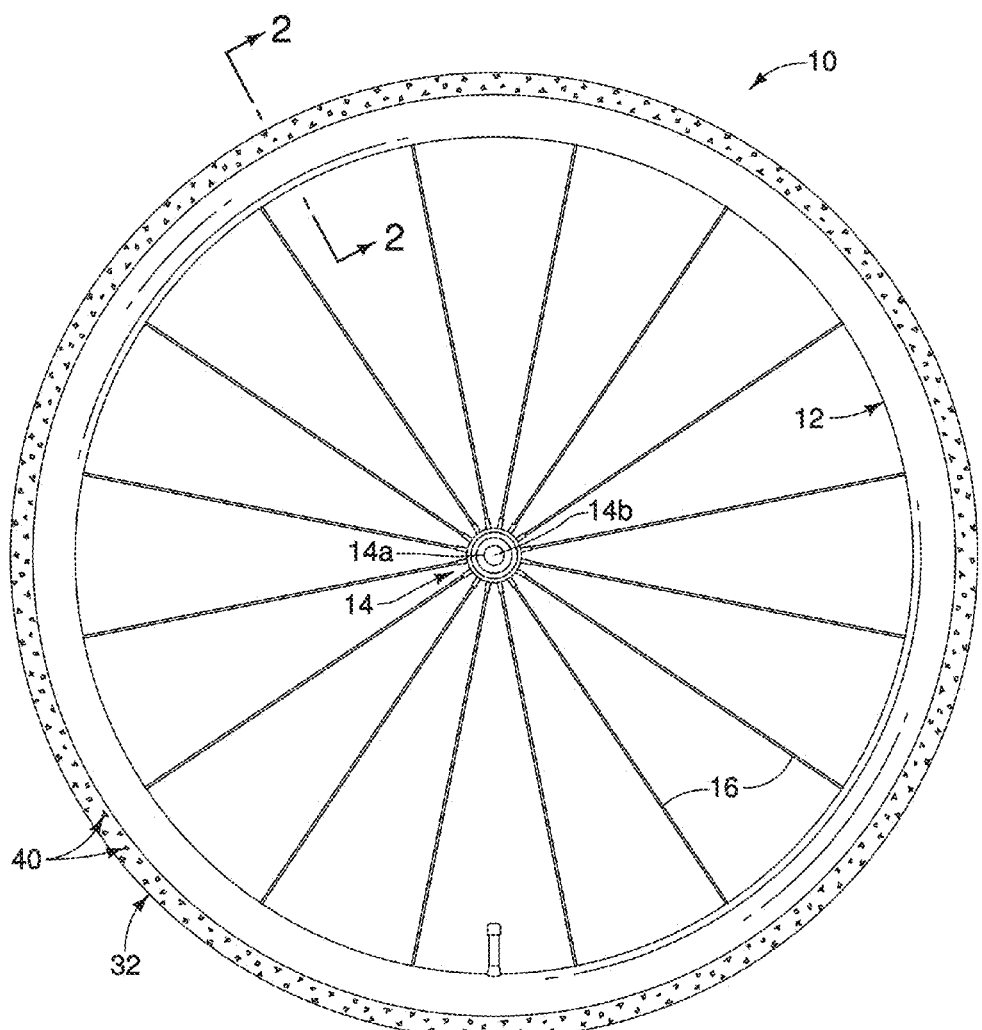
FIG. 1 is a side elevational view of a bicycle wheel that is equipped with a bicycle rim in accordance with a first illustrated embodiment.

Referring initially to FIG. 1, a bicycle wheel 10 is illustrated in accordance with a first embodiment. The bicycle wheel 10 basically includes a bicycle rim 12, a hub assembly 14 and a plurality of spokes 16. As seen in FIG. 1, the bicycle rim 12 is an annular member that is designed for rotation about a center rotational axis formed by a hub axle 14b of the hub assembly 14. The spokes 16 interconnect the bicycle rim 12 and the hub assembly 14 together in a conventional manner. A pneumatic tire (not shown) is secured to the outer surface of the bicycle rim 12 in a conventional manner.

First, the hub assembly 14 will be briefly described. The hub assembly 14 includes a hub shell 14a that is rotatably mounted on the hub axle 14b via a pair of bearing units (not shown). The hub assembly 14 can be any type of bicycle hub assembly that can be used with the bicycle rim 12. Thus, the hub assembly 14 will not be discussed and/or illustrated in further detail herein. Also, while a front hub assembly is illustrated, the bicycle rim 12 can also be used with a rear hub assembly to form a rear wheel as needed and/or desired.

The spokes 16 can be any type of spokes or other type of connecting device (e.g., a metal spoke, a composite spoke, a disc-shaped connecting member, etc.). Thus, the spokes 16 will not be discussed and/or illustrated in detail herein. In the first illustrated embodiment, the spokes 16 are metal, radial tension spokes. The spokes 16 connect the hub assembly 14 to the bicycle rim 12, with one or both ends of each of the spokes 16 being provided with a spoke nipple. In the first illustrated embodiment, for example, sixteen radial spokes 16 are coupled to the bicycle rim 12 at equally spaced circumferential locations as seen in FIG. 1. Alternatively, eight of the spokes 16 may extend from the center of the bicycle rim 12 to one side of the hub assembly 14, while the other eight spokes 16 may extend from the center of the bicycle rim 12 to the other side of the hub assembly 14. Of course, it will be apparent to those skilled in the art from this disclosure that the bicycle rim 12 could be modified to accommodate different spoking arrangements (e.g., all tangential spokes, some tangential spokes and some radial spokes, etc.) without departing from the scope of the present invention. Also, it will also be apparent to those skilled in the art from this disclosure that the bicycle rim 12 could use be modified to accommodate fewer or more than sixteen spokes if needed and/or desired. In any case, the spokes 16 are preferably coupled to the bicycle rim 12 in a circumferentially spaced arrangement.

Figure 2:
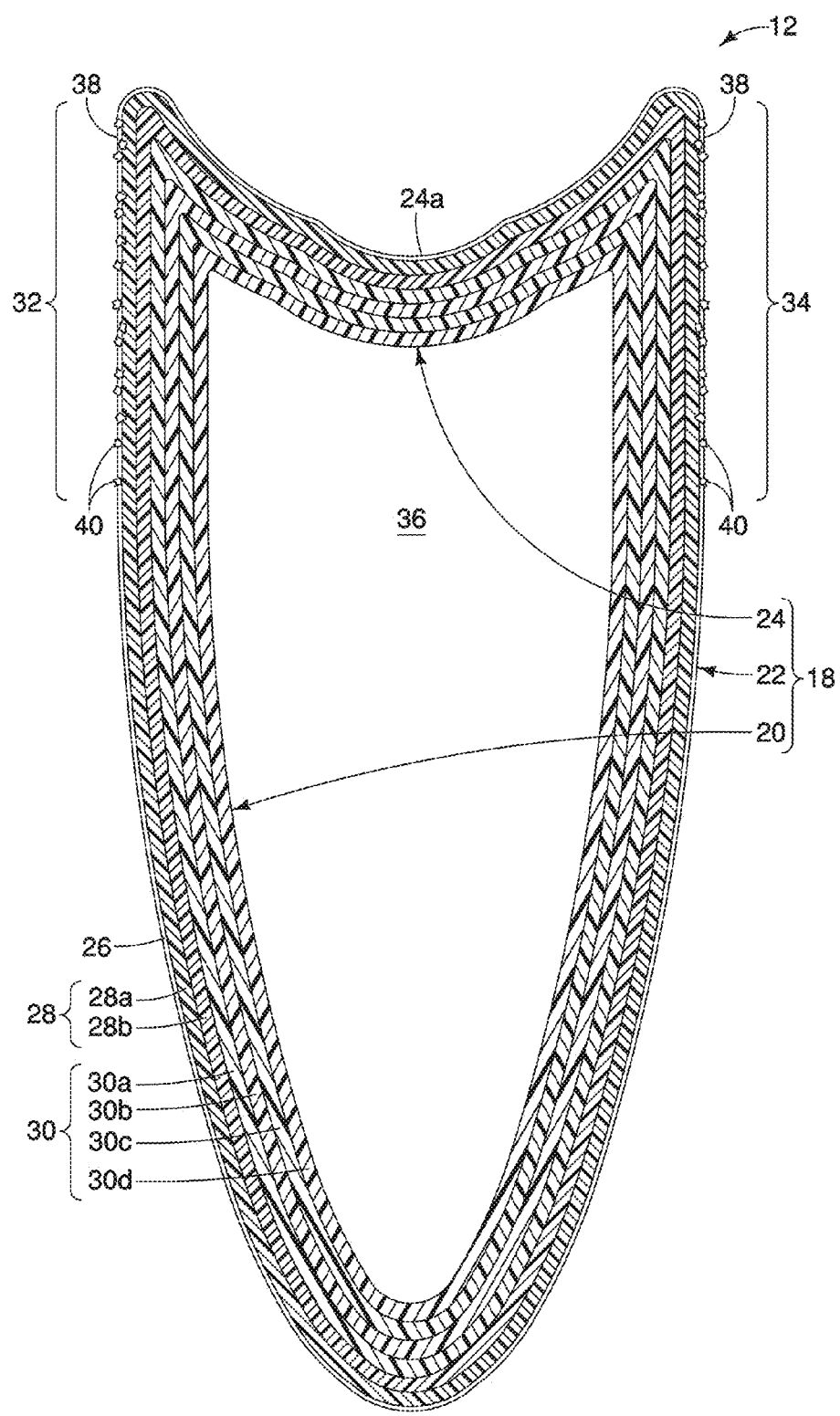
FIG. 2 is an enlarged, partial cross-sectional view of the bicycle rim illustrated in FIG. 1 as seen along section line 2-2 in FIG. 1.

Turning now to FIG. 2, the construction of the bicycle rim 12 will now be discussed in more detail. In the first illustrated embodiment, the bicycle rim 12 is a completely non-metallic composite rim. The bicycle rim 12 basically comprises a main body 18 that has a first annular side wall 20, a second annular side wall 22 and an annular bridge 24. As seen in FIG. 2, the first and second annular side walls 20 and 22 and the annular bridge 24 are basically formed by laminating non-metallic layers in a single piece. Here, in the first illustrated embodiment, one of the non-metallic layers includes a fiberglass layer. Specifically, in the first illustrated embodiment, the first and second annular side walls 20 and 22 and the annular bridge 24 each includes an epoxy layer 26, a composite fiberglass layer 28 and a composite carbon layer 30. The composite fiberglass layer 28 and the composite carbon layer 30 are examples of non-metallic layers. Here, the epoxy layer 26 is disposed directly on the fiberglass layer 28. It will be apparent to those skilled in the art from this disclosure that the layers 28 and 30 of the bicycle rim 12 are not limited to these non-metallic materials. Moreover, the bicycle rim 12 does not need to be a completely non-metallic composite member if needed and/or desired.

The epoxy layer 26 defines an outermost surface of the main body 18. The composite fiberglass layer 28 is arranged immediately below the epoxy layer 26. In other word, the epoxy layer 26 is disposed directly on the composite fiberglass layer 28. In the first illustrated embodiment, the composite fiberglass layer 28 is formed of a first fiberglass sheet 28a and a second fiberglass sheet 28b. Each of the first and second fiberglass sheets 28a and 28b includes unidirectional reinforcing glass fibers that are impregnated with an epoxy resin. The first and second fiberglass sheets 28a and 28b are laminated so that the first and second fiberglass sheets 28a and 28b have directions of the unidirectional reinforcing glass fibers that are different from each other. For example, the first and second fiberglass sheets 28a and 28b are laminated so as to form layers of unidirectional glass fibers that cross each other. It will be apparent to those skilled in the art from this disclosure that the composite fiberglass layer 28 is not limited to being formed of only two fiberglass sheets. Rather, fewer or more of the fiberglass sheets can be used to form the composite fiberglass layer 28 if needed and/or desired. Moreover, the composite fiberglass layer 28 could be eliminated such that the main body 18 or the bicycle rim 12 is primarily formed by the composite carbon layer 30 with the epoxy layer 26 formed of the outermost surface of the composite carbon layer 30. As explained below, epoxy resin from the first fiberglass sheet 28a forms the epoxy layer 26 during the molding process such that the epoxy layer 26 and the composite fiberglass layer 28 form a non-metallic layer of the composite carbon layer 30.

The composite carbon layer 30 is arranged immediately below the composite fiberglass layer 28. In other word, the composite carbon layer 28 is disposed directly on the composite fiberglass layer 28. Also, an interior surface of the composite carbon layer 30 defines an annular interior space or area 36, which can be empty or filled with a foam material or the like. The composite carbon layer 30 is formed of a first carbon fiber sheet 30a, a second carbon fiber sheet 30b, a third carbon fiber sheet 30c and a fourth carbon fiber sheet 30d. Each of the first, second, third and fourth carbon fiber sheets 30a, 30b, 30c and 30d includes unidirectional reinforcing carbon fibers that are impregnated with an epoxy resin. The first, second, third and fourth carbon fiber sheets 30a, 30b, 30c and 30d are laminated so that two adjacent ones of the first, second, third and fourth carbon fiber sheets 30a, 30b, 30c and 30d have directions of the unidirectional reinforcing carbon fibers that are different each other. For example, the first, second, third and fourth carbon fiber sheets 30a, 30b, 30c and 30d are laminated so that the two adjacent ones of the first, second, third and fourth carbon fiber sheets 30a, 30b, 30c and 30d have unidirectional carbon fibers that cross each other. It will be apparent to those skilled in the art from this disclosure that the composite carbon layer 30 is not limited to being formed of four carbon fiber sheets. Rather, fewer or more of the carbon fiber sheets can be used to form the composite carbon layer 30 if needed and/or desired.

The first annular side wall 20 includes a first braking contact portion 32 that is located adjacent a first end of the annular bridge 24. The second annular side wall 22 includes a second braking contact portion 34 that is located adjacent a second end of the annular bridge 24. The first and second braking contact portions 32 and 34 include oppositely facing outer surfaces that are contacted by brake pads during a braking operation as explained below in more detail. Here, these outer surfaces are formed by a non-metallic layer. In particular, the non-metallic layer of the first and second braking contact portions 32 and 34 includes the epoxy layer 26 that defines the outermost surface 38 of the first and second braking contact portions 32 and 34.

As seen in FIG. 2, the annular bridge 24 extends between the first and second annular side walls 20 and 22. The annular bridge 24 has a curved tubular tire engagement surface 24a (i.e., an annular outer surface) that extends between the first and second annular side walls 20 and 22. The curved tubular tire engagement surface 24a is concaved and transversely curved to form an annular tire engagement structure for attaching a pneumatic tire (not shown) thereon.

Figure 3:
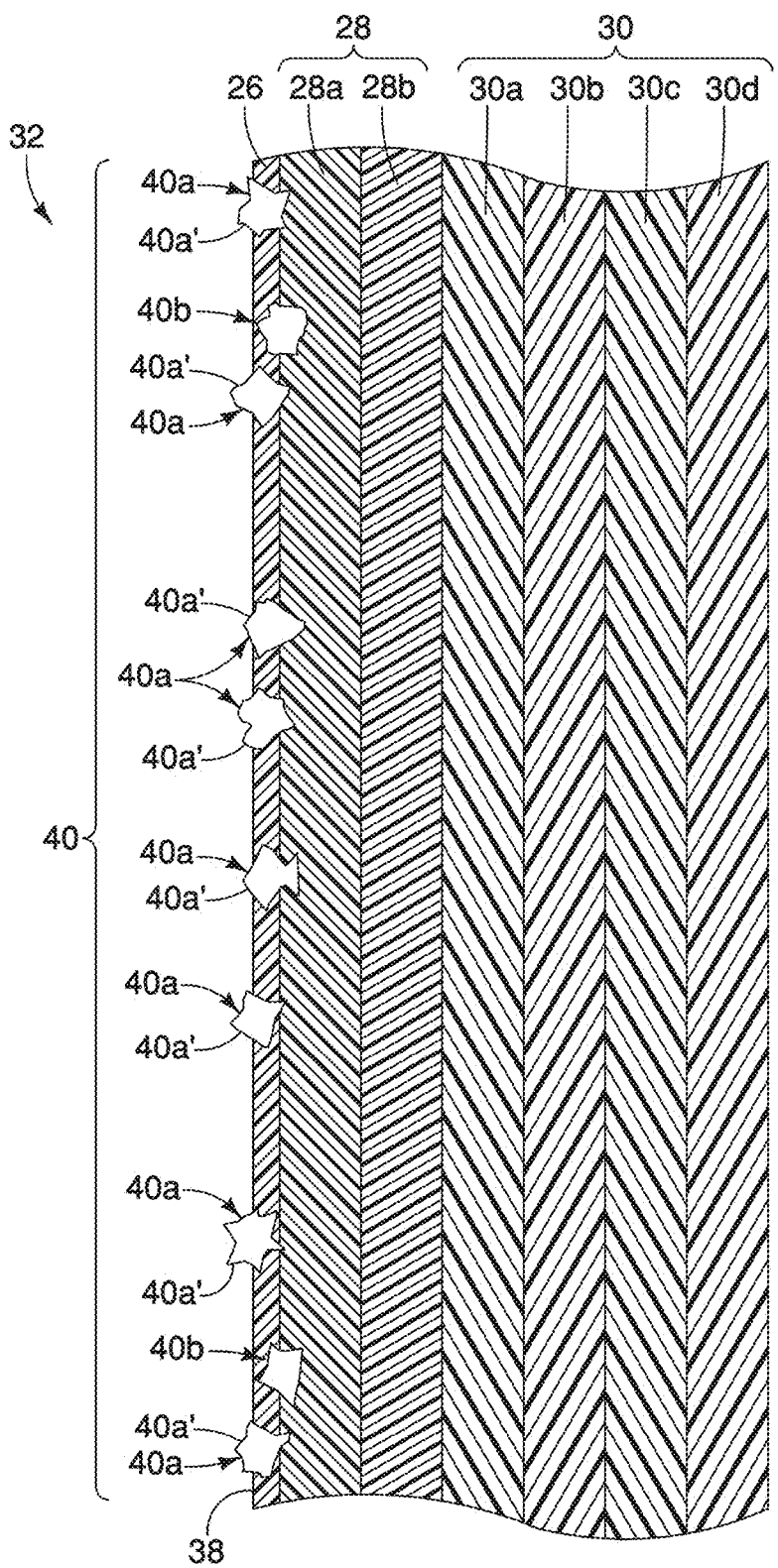
FIG. 3 is a further enlarged, partial cross-sectional view of a first braking contact portion of the bicycle rim illustrated in FIG. 2.
Figure 4:
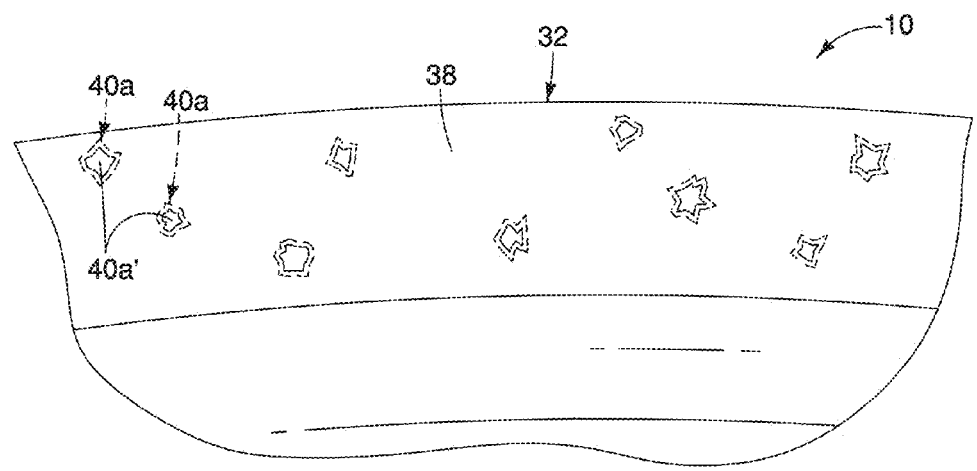
FIG. 4 is an enlarged, partial side elevational view of the first braking contact portion of the bicycle rim illustrated in FIG. 1.

Referring to FIGS. 2 to 4, the first and second braking contact portions 32 and 34 will be described in more detail. As seen in FIG. 2, in the first illustrated embodiment, both of the first and second braking contact portions 32 and 34 have a plurality of soft additives 40 at least partially embedded in a non-metallic layer (e.g., the epoxy layer 26 of the first illustrated embodiment). However, it will be apparent from this disclosure that only one of the first and second braking contact portions 32 and 34 could be provided with the soft additives 40 at least partially embedded in a non-metallic layer (e.g., the epoxy layer 26 of the first illustrated embodiment). In other words, at least one of the first and second braking contact portions 32 and 34 has a plurality of soft additives at least partially embedded in a non-metallic layer (e.g., the epoxy layer 26 of the first illustrated embodiment). In any case, the soft additives 40 improve the wet braking force characteristics of the first and second braking contact portions 32 and 34.

The only difference between the first and second braking contact portions 32 and 34 is where the first and second braking contact portions 32 and 34 are disposed and there orientation. Therefore, only the first braking contact portion 32 will be discussed and illustrated in FIGS. 3 to 4. Since the second braking contact portion 34 is substantially identical to the first braking contact portion 32, the description of the second braking contact portion 34 is omitted for the sake of brevity. It will be apparent to those skilled in the art from this disclosure that the construction of the first braking contact portion 32 as discussed and illustrated herein applies to the construction of the second braking contact portion 34.

As illustrated in FIGS. 3 to 4, the first braking contact portion 32 has the soft additives 40 that are embedded in the epoxy layer 26 and the composite fiberglass layer 28 (e.g., the non-metallic layer). In particular, in the first illustrated embodiment, the soft additives 40 include a plurality of exposed soft granules 40a and a plurality of non-exposed soft granules 40b. The exposed soft granules 40a are partially exposed with respect to the outermost surface 38 of the first and second braking contact portions 32 and 34 such that each of the exposed soft granules 40a has an exposed surface 40a'. It will be apparent from this disclosure that the soft additives 40 can all be fully embedded in the epoxy layer 26, since the soft additives would be exposed over time due to the abrasion from braking. Also in the first illustrated embodiment, some of the non-exposed soft granules 40b are fully embedded in the epoxy layer 26, while other ones of the non-exposed soft granules 40b are partially embedded in the epoxy layer 26 and partially embedded in the composite fiberglass layer 28.

As explained above, the epoxy layer 26 is disposed directly on the composite fiberglass layer 28. The soft additives 40 are dispersed in the epoxy layer 26. As mentioned above, the exposed soft granules 40a of the soft additives 40 are at least partially exposed on the outermost surface 38 of the first and second braking contact portions 32 and 34. Also in the first illustrated embodiment, as mentioned above, the partially embedded granules 40b of the soft additives 40 are further partially disposed in the fiberglass layer 28. In particular, the partially embedded granules 40b of the soft additives 40 are partially embedded in both the epoxy layer 26 and the first fiberglass sheet 28a.

As seen in FIGS. 3 to 4, each of the exposed soft granules 40a is only partially exposed on the outermost surface 38 of the first braking contact portion 32. Of course, in the first illustrated embodiment, each of the exposed soft granules 40a of the second braking contact portion 34 has the same configuration. Preferably, each of the exposed surfaces 40a' of the exposed soft granules 40a is less than 50% of total surface area of each of the exposed soft granules 40a of the soft additives 40 as seen in FIGS. 3 and 4. More preferably, each of the exposed surfaces 40a' of the exposed soft granules 40a is less than 20% of total surface area of each of the exposed soft granules 40a of the soft additives 40. If the exposed surface 40a' is greater than 50% of total surface area of the exposed soft granules 40a, then the possibility of the exposed soft granules 40a being detached during a braking operation increases.

The soft additives 40 will be discussed below in detail. Preferably, the soft additives 40 are only located in the areas of the first and second braking contact portions 32 and 34. Each of the soft additives 40 includes an elastomeric material. For example, in one embodiment, the elastomeric material is a nitrile rubber. For example, in another embodiment, the elastomeric material is a fluorinated elastomer. The soft additives 40 include powder size granules having predetermined grain sizes in a range of 850 to 1,000 µm. The soft additives 40 are minute granules that have irregular shapes. However, if the soft additives 40 are formed with another process, the shapes of the minute granules of the soft additives 40 can have a regular shape.

Figure 5:
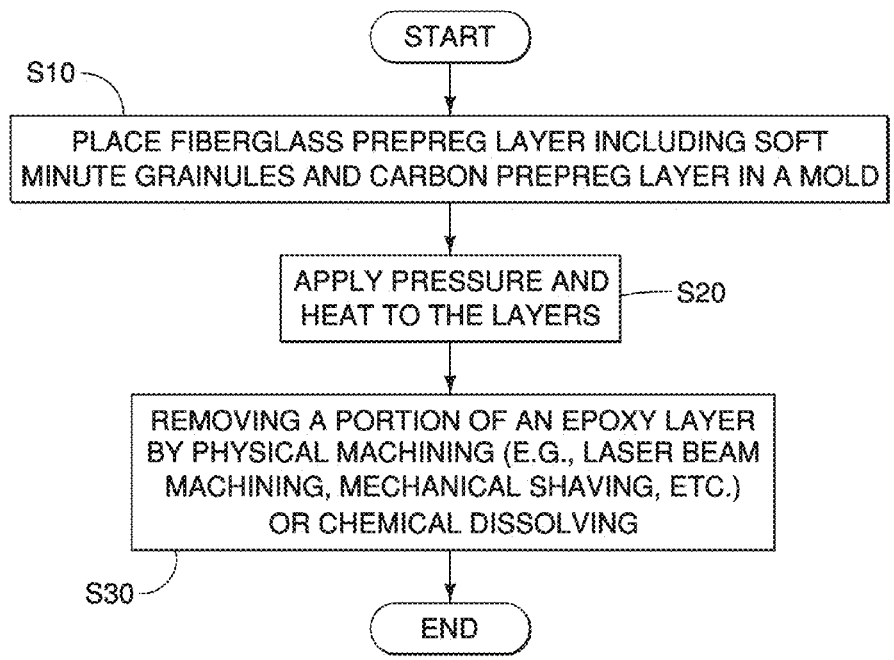
FIG. 5 is a flowchart showing a process for forming the first braking contact portion of the bicycle rim.

Referring now to the flow chart of FIG. 5, the processing for forming the first braking contact portion 32 will be described.

The composite fiberglass layer 28 and the composite carbon layer 30 are used to form the first and second braking contact portions 32 and 34. As explained above, the first and second fiberglass sheets 28a and 28b are preferably thin sheets of continuous reinforcement glass fibers that are impregnated with an epoxy resin, which are often called fiberglass prepreg sheets. Likewise, the first, second, third and fourth carbon fiber sheets 30a, 30b, 30c and 30d are preferably thin sheets of continuous reinforcement carbon fibers that are impregnated with epoxy resin, which are often called carbon prepreg sheets. Alternatively, the epoxy resin can be added as a separate component from the fiber sheets Furthermore, each of the first and second fiberglass sheets 28a and 28b which are used to form the first braking contact portion 32 includes a plurality of soft additives which are discussed above as the soft additives 40 in FIG. 3. After molding, some of these soft additives become the exposed soft granules 40a as shown in FIGS. 3 and 4.

Figure 6:
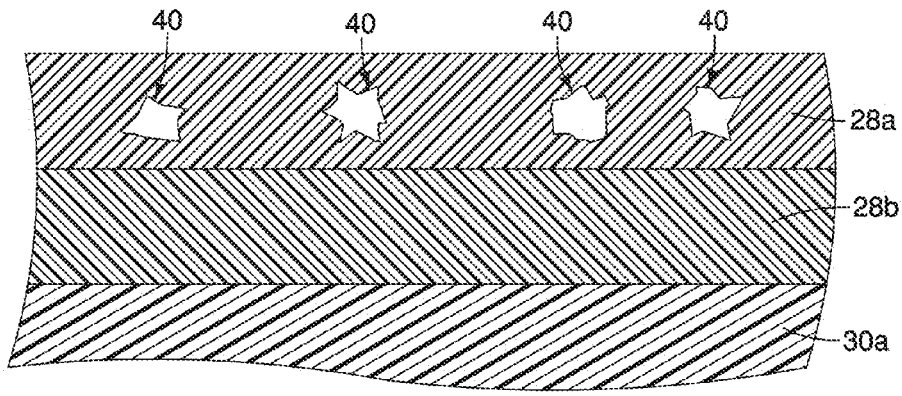
FIG. 6 is an enlarged, partial cross-sectional view of portions of a composite fiberglass layer and a composite carbon layer that are placed in a mold together with the soft additives at a time prior to molding for forming the bicycle rim illustrated in FIG. 1.

In step S10, the fiberglass sheets 28a and 28b of the composite fiberglass layer 28 and the carbon fiber sheets 30a, 30b, 30c and 30d of the composite carbon layer 30 are placed in a mold. In particular, the fiber sheets forming the composite fiberglass layer 28 and the composite carbon layer 30 are accumulated in the mold so that the composite fiberglass layer 28 is placed on the composite carbon layer 30. Preferably, the soft additives 40 are preliminarily embedded in the fiberglass sheet 28a. The fiberglass sheet 28a including the soft additives 40 will form the first and second braking contact portions 32 and 34. Alternatively, the soft additives 40 could be adhered along the areas of the fiberglass sheet 28a. Further alternatively, the soft additives 40 could be placed in the mold separately from the fiberglass sheet 28a. FIG. 6 shows step in which the first fiberglass sheet 28a, the second fiberglass sheet 28b and the first carbon layer 30a are placed in a mold (not shown) while the second, third and fourth carbon fiber sheets 30b, 30c and 30d are not illustrated for the sake of brevity.

When the composite fiberglass layer 28 is placed in the mold, the first and second fiberglass sheets 28a and 28b are accumulated to form layers of unidirectional glass fibers that cross each other. More specifically, the first fiberglass sheet 28a is accumulated on the second fiberglass sheet 28b so that a direction of the unidirectional reinforcing glass fibers of the first fiberglass sheet 28a is approximately perpendicular to a direction of the unidirectional reinforcing glass fibers of the second fiberglass sheet 28b. Likewise, when the composite carbon layer 30 is placed in the mold, the first, second, third and fourth carbon fiber sheets 30a, 30b, 30c and 30d are accumulated so that the two adjacent ones of the first, second, third and fourth carbon fiber sheets 30a, 30b, 30c and 30d have unidirectional carbon fibers that cross each other. For example, the carbon fiber sheet 30a is laminated on the carbon fiber sheet 30b so that a direction of the unidirectional reinforcing carbon fibers of the carbon fiber sheet 30a is approximately perpendicular to a direction of the unidirectional reinforcing carbon fibers of the carbon fiber sheet 30b. Moreover, the carbon fiber sheet 30b is disposed on the carbon fiber sheet 30c so that the direction of the unidirectional reinforcing carbon fibers of the carbon fiber sheet 30b is approximately perpendicular to a direction of the unidirectional reinforcing carbon fibers of the carbon fiber sheet 30c. Furthermore, the carbon fiber sheet 30c is disposed on the carbon fiber sheet 30d so that the direction of the unidirectional reinforcing carbon fibers of the carbon fiber sheet 30c is approximately perpendicular to a direction of the unidirectional reinforcing fibers of carbon fiber sheet 30d.

Figure 7:
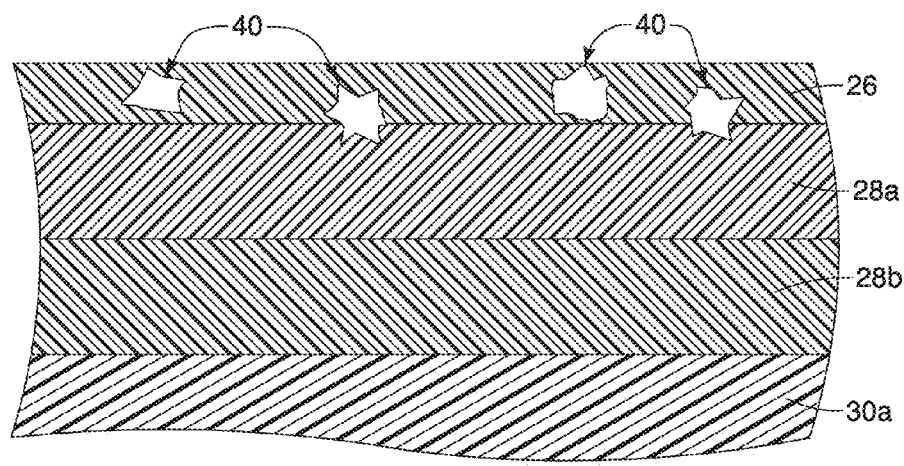
FIG. 7 is an enlarged, partial cross-sectional view of portions of an epoxy layer, the composite fiberglass layer and the composite carbon layer with the soft additives at a time prior to removing a portion of the epoxy layer after molding for forming the bicycle rim illustrated in FIG. 1.

In step S20, pressure and heat are applied to the composite fiberglass layer 28 and the composite carbon layer 30 in the mold. In particular, the pressure and heat are applied from a side of the composite carbon layer 30 to a side of the composite fiberglass layer 28 while an exterior surface of the composite fiberglass layer 28 that is opposite of a surface that contacts the composite carbon layer 30 is pressed against a flat portion of the mold (not shown). The pressure and heat cause the epoxy resin that is included in the fiberglass sheets 28a and 28b of the composite fiberglass layer 28 and the carbon fiber sheets 30a, 30b, 30c and 30d of the composite carbon layer 30 to be melted and cause the composite fiberglass layer 28 and the composite carbon layer 30 to bond together as an integrated one-piece member. Also, the pressure and heat cause the epoxy resin to move toward the exterior surface of the composite fiberglass layer 28 and encapsulate the soft additives 40 that are included in the fiberglass sheet 28a of the composite fiberglass layer 28. As a result, as seen in FIG. 7, the epoxy layer 26 is formed to cover the composite fiberglass layer 28, such that the soft additives 40 are completely embedded in the epoxy layer 26 and/or the first fiberglass sheet 28a. At this moment, as seen in FIG. 7, the surfaces of the soft additives 40 are not exposed from the epoxy layer 26 because of the pressure from the flat portion of the mold. Subsequently, the epoxy layer 26, the composite fiberglass layer 28 and the composite carbon layer 30 in the mold are cooled and removed from the mold. A thickness of the epoxy layer 26 obtained in this step is, for example, about 100 micrometers.

Figure 8:
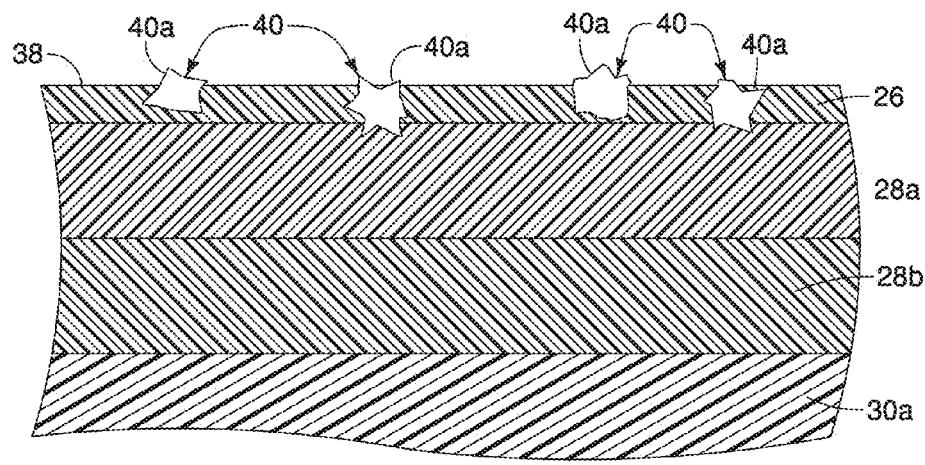
FIG. 8 is an enlarged, partial cross-sectional view of a portion the first braking contact portion of the bicycle rim illustrated in FIG. 1 after removing a portion of the epoxy layer to partially expose some of the soft additives.

Next, in step S30, a portion of the epoxy layer 26 is removed to form the soft additives 40. In particular, the soft additives 40 are formed by a process of physical machining which is processed by a machine tool to physically operate on the portion of the epoxy layer 26. The term "physical machining" as used herein includes, for example, a laser beam machining, a mechanical shaving, etc. Alternatively, the portion of the epoxy layer 26 may be removed by a process of chemical dissolving. As seen in FIG. 8, after removing the portion of epoxy layer 26, the epoxy layer 26 is thinner than prior to the removal of the portion of the epoxy layer 26 as shown in FIG. 7, and the exposed soft granules 40a are provided. After the portion of the epoxy layer 26 is removed, the thickness of the epoxy layer 26 is, for example, about 90-95 micrometers.

In Figures, the epoxy layer 26, the composite fiberglass layer 28, the composite carbon layer 30 and the soft additives 40 are only schematically illustrated for explanation. Thus, the thicknesses of the layers 26, 28 and 30, and the size of the soft additives 40 are not necessarily to scale with respect to each other.

As explained above, the bicycle rim 12 has the first and second braking contact portions 32 and 34 with the exposed soft granules 40a that are partially embedded in the epoxy layer 26 and that are partially exposed on the outermost surfaces 38. With this arrangement, when the first and second braking contact portions 32 and 34 are contacted by brake pads of a brake device during a braking operation, the exposed soft granules 40a allow a friction force between the first and second braking contact portions 32 and 34 and the brake pads of the brake device to increase during wet conditions. Accordingly, with this bicycle rim 12, brake performance can be improved during wet conditions.

In this embodiment illustrated above, each of the first and second braking contact portions 32 and 34 has the soft additives 40. However, alternatively, the soft additives 40 can be partially exposed on the outermost surface 38 of only one of the first and second braking contact portions 32 and 34.

In this embodiment illustrated above, the composite fiberglass layer 28 is formed of two fiberglass sheets (i.e., the first and second fiberglass sheets 28a and 28b). However, alternatively, the composite fiberglass layer 28 can be formed of only one fiberglass layer if needed and/or desired. Also, alternatively, the composite fiberglass layer 28 can be formed of more than three fiberglass sheets.

In this embodiment illustrated above, the composite carbon layer 30 is formed of the four carbon fiber sheets (i.e., the first, second, third and fourth carbon fiber sheets 30a, 30b, 30c and 30d). However, alternatively, the composite carbon layer 30 can be formed of only one carbon layer or any number of carbon sheets if needed and/or desired.

In this embodiment illustrated above, as shown in FIGS. 1 and 2, the soft additives 40 are disposed in a substantially uniform and substantially continuous manner around the outermost surfaces 38 that constitute the first and second braking contact portions 32 and 34. However, alternatively, the soft additives 40 may be disposed only in selected areas of each of the outermost surfaces 38 that constitute the first and second braking contact portions 32 and 34 such that circumferential areas of the first and second braking contact portions 32 and 34 are devoid of any of the soft additives 40. In this case, it is preferable to provide more exposed soft additives per square meter in those selected areas of the outermost surface 38 than in the first embodiment discussed above.

In this embodiment illustrated above, the bicycle rim 12 is a completely non-metallic composite member. However, alternatingly, the bicycle rim 12 may be a composite member that includes the non-metallic layer in which the soft additives 40 are embedded and a metallic member.

Second Embodiment

Figure 9:
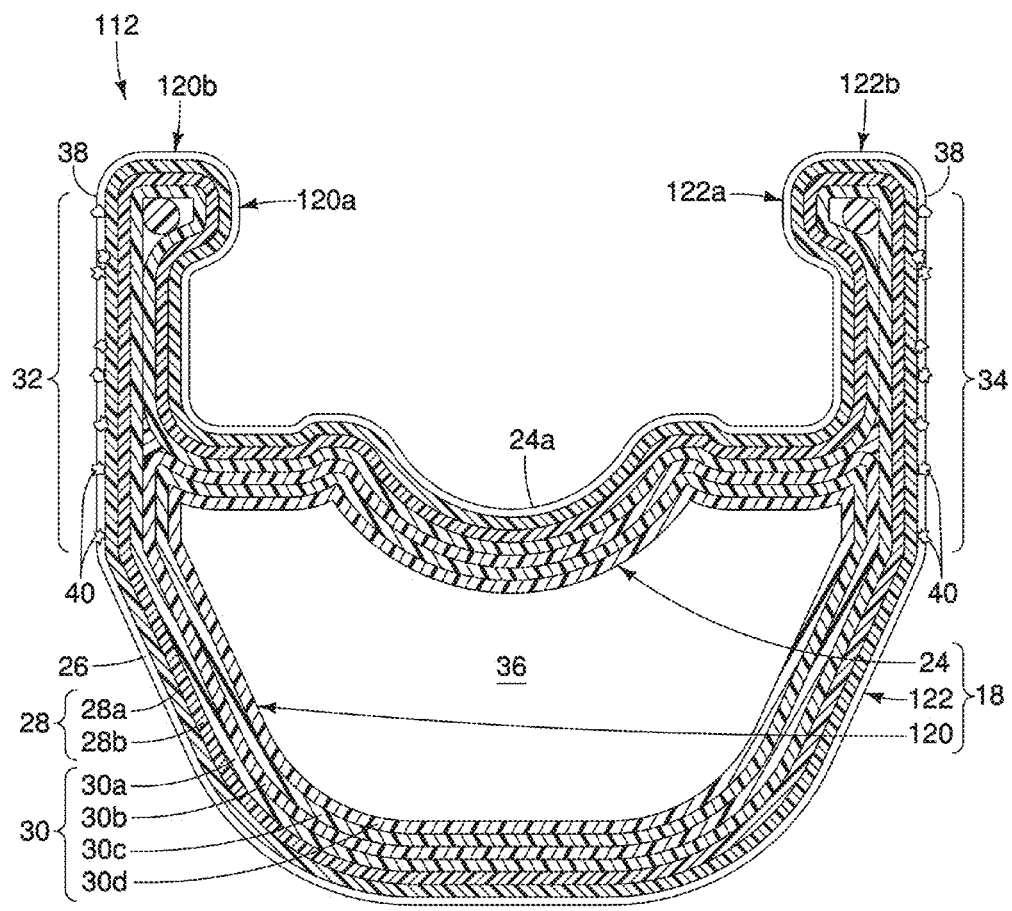
FIG. 9 is an enlarged, partial cross-sectional view, similar to the cross section of FIG. 1, of a bicycle rim in accordance with a second embodiment.

Referring now to FIG. 9, a bicycle rim 112 in accordance with a second embodiment will now be explained. The bicycle rim 112 is used with the hub assembly 14 and the spokes 16 to form a bicycle wheel. The bicycle rim 112 has a first annular side wall 120, a second annular side wall 122 and an annular bridge 24. The annular bridge 24 extends between the first and second annular side walls 120 and 122. Basically, the bicycle rim 112 of the second embodiment is a composite bicycle rim that is identical to the first embodiment, except that each of the first and second annular side walls 120 and 122 has a clincher portion 120a, 122a along an outer peripheral edge 120b, 122b, respectively. In particular, the first annular side wall 120 has the clincher portion 120a along the outer peripheral edge 120b for retaining a first bead of a tire (not shown). Likewise, the second annular side wall 122 has the clincher portion 122a along the outer peripheral edge 122b for retaining a second bead of a tire (not shown).

In view of the similarity between the first and second embodiments, the parts of the second embodiment that are identical to the parts of the first embodiment and functionally identical (but not exactly identical) to the parts of the first embodiment will be given the same reference numerals as the parts of the first embodiment. Moreover, the second embodiment is identical to the first embodiment in that the first annular side wall 120 includes the first braking contact portion 32, the second annular side wall 122 includes the second braking contact portion 34, and at least one of the first and second braking contact portions 32 and 34 has the soft additives 40. Accordingly, the descriptions of the parts of the second embodiment that are identical to the parts of the first embodiment and functionally identical (but not exactly identical) to the parts of the first embodiment may be omitted for the sake of brevity. Also in FIG. 9, as in the first embodiment, the epoxy layer 26, the composite fiberglass layer 28, the composite carbon layer 30 and the soft additives 40 are only schematically illustrated for explanation. Thus, the thicknesses of the epoxy layer 26, the composite fiberglass layer 28 and the composite carbon layer 30 the size of the soft additives 40 are not necessarily to scale with respect to each other in FIG. 9.

Third Embodiment

Figure 10:
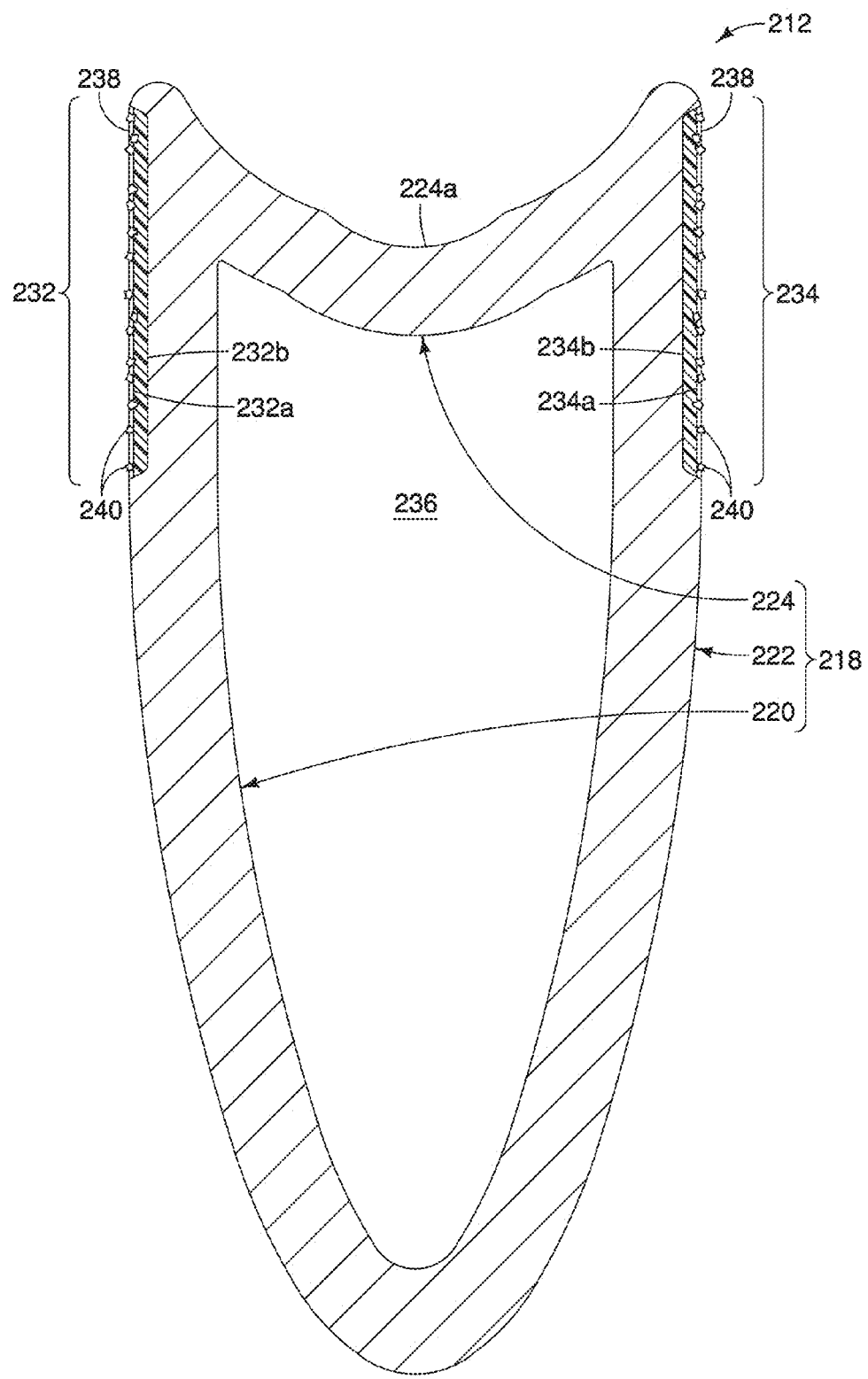
FIG. 10 is an enlarged, partial cross-sectional view, similar to the cross section of FIG. 1, of a bicycle rim in accordance with a third embodiment.

Referring now to FIG. 10, a bicycle rim 212 in accordance with a third embodiment will now be explained. The bicycle rim 212 is used with the hub assembly 14 and the spokes 16 to form a bicycle wheel. The bicycle rim 212 comprises a main body 218 that has a first annular side wall 220, a second annular side wall 222 and an annular bridge 224. The annular bridge 224 extends between the first and second annular side walls 220 and 222. The first annular side wall 220 includes a first braking contact portion 232 made of a composite material. Likewise, the second annular side wall 222 includes a second braking contact portion 234 made of a composite material. In the third embodiment, the first and second annular side walls 220 and 222, except for the first and second braking contact portions 232 and 234, and the annular bridge 224 are made of a metallic material such as an aluminum alloy. Typically, the first and second annular side walls 220 and 222 and the annular bridge 224 can be extruded to the desired cross sectional shape and then bent into a loop, where the ends are butt welded or otherwise connected together. Then the first and second braking contact portions 232 and 234 are added to the first and second annular side walls 220 and 222, respectively. The process for attaching the first and second braking contact portions 232 and 234 to the first and second annular side walls 220 and 222, respectively, is basically the same as the process of FIG. 5, except that the first and second braking contact portions 232 and 234 are placed on the main body 218 during the forming of the first and second braking contact portions 232 and 234.

The overall shape of the bicycle rim 212 is identical to the bicycle rim 12. Thus, the annular bridge 224 includes a curved tubular tire engagement surface 224a (i.e., an annular outer surface) that extends between the first and second annular side walls 220 and 222. Also the first and second annular side walls 220 and 222 and the annular bridge 224 define an annular interior space or area 236, which can be empty or filled with a foam material or the like.

In the third embodiment, the first and second braking contact portions 232 and 234 are continuous annular rings that are disposed in annular recesses of the first and second annular side walls 220 and 222, respectively. Alternatively, instead of the first and second braking contact portions 232 and 234 being disposed in annular recesses, the first and second braking contact portions 232 and 234 can be overlaid on the first and second annular side walls 220 and 222 so that the first and second braking contact portions 232 and 234 form annular protrusions with respect to the adjacent outer surfaces of the first and second annular side walls 220 and 222.

Here, the first braking contact portion 232 includes an epoxy layer 232a and a fiber reinforced layer 232b. Likewise, the second braking contact portion 234 includes an epoxy layer 234a and a fiber reinforced layer 234b. Here, each of the first and second braking contact portions 232 and 234 includes a plurality of soft additives 240. Alternatively, only one of the first and second braking contact portions 232 and 234 has a plurality of soft additives 240. Preferably, at least one of the first and second braking contact portions 232 and 234 has the soft additives 240. Also, while each of the fiber reinforced layers 232b and 234b is illustrated as being a single material, it will be apparent from the disclosure that the fiber reinforced layers 232b and 234b can each be formed of one or more fiber reinforced sheets that are laminated into single piece. As in the first embodiment, explained above, the fiber reinforced layers 232b and 234b are each impregnated with an epoxy resin such that from the epoxy resin from the fiber reinforced layers 232b and 234b forms the epoxy layers 232a and 234a, respectively, during the molding process. Preferably, in the third illustrated embodiment, the fiber reinforced layers 232b and 234b are formed of one or more fiberglass layers and/or one or more carbon layers. Thus, the epoxy layers 232a and 234a and the fiber reinforced layers 232b and 234b are examples of non-metallic layers. The epoxy layers 232a and 234a define the outermost surfaces 238 of the first and second braking contact portions 232 and 234.

The soft additives 240 are the same as the soft additives 240 of the first embodiment. In other words, each of the additives 240 includes an elastomeric material such as a nitrile rubber or a fluorinated elastomer. The soft additives 240 include powder size granules having predetermined grain sizes in a range of 850 to 1,000 µm. The soft additives 240 are minute granules that have irregular shapes. However, if the soft additives 240 are formed with another process, the shapes of the minute granules of the soft additives 240 can have a regular shape.

Also in FIG. 10, as in the first embodiment, the epoxy layers 232a and 234a, the fiber reinforced layers 232b and 234b and the soft additives 240 are only schematically illustrated for explanation. Thus, the thicknesses of the layers 232a, 232b, 234a and 234b, and the size of the soft additives 240 are not necessarily to scale with respect to each other in FIG. 10.

Fourth Embodiment

Referring now to FIG. 1, a bicycle rim 312 in accordance with a fourth embodiment will now be explained. The bicycle rim 312 is used with the hub assembly 14 and the spokes 16 to form a bicycle wheel. The bicycle rim 312 comprises a main body 318 that has a first annular side wall 320, a second annular side wall 322 and an annular bridge 324. The annular bridge 324 extends between the first and second annular side walls 320 and 322.

The first annular side wall 320 includes a first braking contact portion 332 made of a composite material. Likewise, the second annular side wall 322 includes a second braking contact portion 334 made of a composite material. In the fourth embodiment, the first and second annular side walls 320 and 322, except for the first and second braking contact portions 332 and 334, and the annular bridge 324 are made of a metallic material such as an aluminum alloy. Typically, the first and second annular side walls 320 and 322 and the annular bridge 324 can be extruded to the desired cross sectional shape and then bent into a loop, where the ends are butt welded or otherwise connected together. Then the first and second braking contact portions 332 and 334 are added to the first and second annular side walls 320 and 322, respectively. The process for attaching the first and second braking contact portions 332 and 334 to the first and second annular side walls 320 and 322, respectively, is basically the same as the process of FIG. 5, except that the first and second braking contact portions 332 and 334 are placed on the main body 318 during the forming of the first and second braking contact portions 332 and 334.

Basically, the overall shape of the bicycle rim 312 of the fourth embodiment is a bicycle rim that is identical to the overall. shape of the second embodiment. Thus, each of the first and second annular side walls 320 and 322 has a clincher portion 320a, 322a along an outer peripheral edge 320b, 322b, respectively. Also, the annular bridge 324 includes a curved tubular tire engagementsurface 324a (i.e., an annular outer surface) that extends between the first and second annular side walls 320 and 322. Also the first and second annular side walls 320 and 322 and the annular bridge 324 define an annular interior space or area 336, which can he empty or filled with a foam material or the like.

In the fourth embodiment, the first and second braking contact portions 332 and 334 are continuous annular rings that are disposed in annular recesses of the first and second annular side walls 320 and 322, respectively. Alternatively, instead of the first and second braking contact portions 332 and 334 being disposed in annular recesses, the first and second braking contact portions 332 and 334 can be overlaid on the first and second annular side walls 320 and 322 so that the first and second braking contact portions 332 and 334 form annular protrusions with respect to the adjacent outer surfaces of the first and second annular side walls 320 and 322.

Here, the first braking contact portion 332 includes an epoxy layer 332a and a fiber reinforced layer 332b. Likewise, the second braking contact portion 334 includes an epoxy layer 334a and a fiber reinforced layer 334b. Here, each of the first and second braking contact portions 332 and 334 includes a plurality of soft additives 340. Alternatively, only one of the first and second braking contact portions 332 and 334 has a plurality of soft additives 340. Preferably, at least one of the first and second braking contact portions 332 and 334 has the soft additives 340. Also, while each of the fiber reinforced layers 332b and 334b is illustrated as being a single material, it will be apparent from the disclosure that the fiber reinforced layers 332b and 334b can each be formed of one or more fiber reinforced sheets that are laminated into single piece. As in the first embodiment, explained above, the fiber reinforced layers 332b and 334b are each impregnated with an epoxy resin such that from the epoxy resin from the fiber reinforced layers 332b and 334b forms the epoxy layers 332a and 334a, respectively, during the molding process. Preferably, in the third illustrated embodiment, the fiber reinforced layers 332b and 334b are formed of one or more fiberglass layers and/or one or more carbon layers. Thus, the epoxy layers 332a and 334a and the fiber reinforced layers 332b and 334b are examples of non-metallic layers. The epoxy layers 332a and 334a define the outermost surfaces 338 of the first and second braking contact portions 332 and 334.

The soft additives 340 are the same as the soft additives 40 of the first embodiment. In other words, each of the additives 340 includes an elastomeric material such as a nitrile rubber or a fluorinated elastomer. The soft additives 340 include powder size granules having predetermined grain sizes in a range of 850 to 1,000 µm. The soft additives 340 are minute granules that have irregular shapes. However, if the soft additives 340 are formed with another process, the shapes of the minute granules of the soft additives 340 can have a regular shape.

Figure 11:
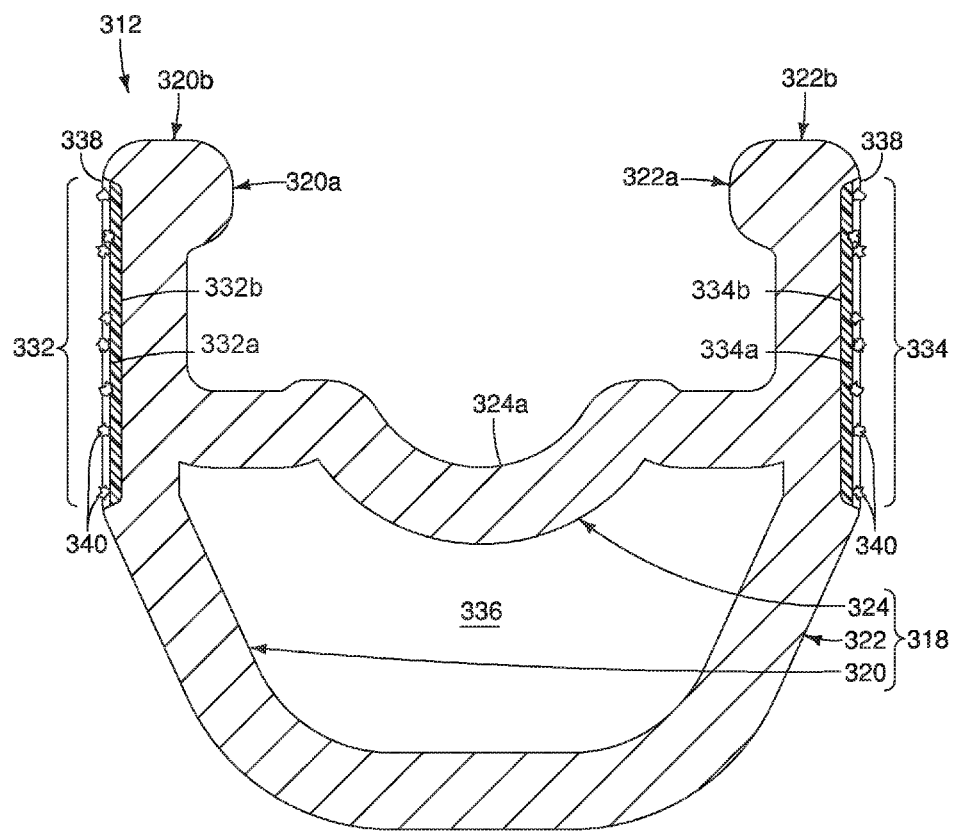
FIG. 11 is an enlarged, partial cross-sectional view, similar to the cross section of FIG. 9, of a bicycle rim in accordance with a fourth embodiment.

Also in FIG. 11, as in the first embodiment, the epoxy layers 332*a* and 334*a*, the fiber reinforced layers 332*b* and 334*b* and the soft additives 340 are only schematically illustrated for explanation. Thus, the thicknesses of the layers 332*a*, 332*b*, 334*a* and 334*b*, and the size of the soft additives 340 are not necessarily to scale with respect to each other in FIG. 11.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle rim. Accordingly, these directional terms, as utilized to describe the bicycle rim should be interpreted relative to a bicycle in an upright riding position on a horizontal surface and that is equipped with the bicycle rim. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled". "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle rim comprising:
a first annular side wall including a first braking contact portion;
a second annular side wall including a second braking contact portion; and
an annular bridge extending between the first and second annular side walls;
at least one of the first and second braking contact portions having a plurality of soft additives at least partially embedded in a non-metallic layer, the soft additives being made of a material that is softer than the non-metallic layer, the soft additives having the form of discrete granules having a particle size in a prescribed range.
2. The bicycle rim according to the claim 1, wherein the soft additives are at least partially exposed on an outermost surface of the at least one of the first and second braking contact portions.
3. The bicycle rim according to claim 1, wherein both of the first and second braking contact portions have the soft additives.
4. The bicycle rim according to claim 2, wherein each of the soft additives has an exposed surface, each of the exposed surfaces is less than 50% of total surface area of each of the soft additives.
5. A bicycle rim comprising:
a first annular side wall including a first braking contact portion;
a second annular side wall including a second braking contact portion; and
an annular bridge extending between the first and second annular side walls;
at least one of the first and second braking contact portions having a plurality of soft additives at least partially embedded in a non-metallic layer, the soft additives being at least partially exposed on an outermost surface of the at least one of the first and second braking contact portions such that each of the soft additives has an exposed surface, each of the exposed surfaces being less than 20% of total surface area of each of the soft additives.
6. The bicycle rim according to claim 1, wherein each of the soft additives includes an elastomeric material.
7. The bicycle rim according to claim 6, wherein the elastomeric material is a nitrile rubber.
8. The bicycle rim according to claim 6, wherein the elastomeric material is a fluorinated elastomer.

9. A bicycle rim comprising:
a first annular side wall including a first braking contact portion;
a second annular side wall including a second braking contact portion; and
an annular bridge extending between the first and second annular side walls;
at least one of the first and second braking contact portions having a plurality of soft additives at least partially embedded in a non-metallic layer,
the non-metallic layer of the at least one of the first and second braking contact portions including an epoxy layer defining the outermost surface of the at least one of the first and second braking contact portions.

10. The bicycle rim according to claim 9, wherein the soft additives are partially disposed in the epoxy layer.

11. The bicycle rim according to claim 9, wherein the non-metallic layer further includes a fiberglass layer, and
the epoxy layer is disposed directly on the fiberglass layer.

12. The bicycle rim according to claim 11, wherein
the soft additives are partially disposed in the epoxy layer.

13. The bicycle rim according to claim 12, wherein
the soft additives are further partially disposed in the fiberglass layer.

14. The bicycle rim according to claim 1, wherein
the annular bridge has a curved tubular tire engagement surface extending between the first and second annular side walls.

15. The bicycle rim according to claim 1, wherein
each of the first and second annular side walls has a clincher portion along an outer peripheral edge.

16. The bicycle rim according to claim 1, wherein
the discrete granules of the soft additives have a grain size in the range 850 to 1000 micrometers.

* * * * *